(12) United States Patent
Moore et al.

(10) Patent No.: US 9,628,618 B1
(45) Date of Patent: Apr. 18, 2017

(54) SYSTEM, METHOD AND COMPUTER READABLE MEDIUM FOR CALL CENTER MANAGEMENT

(75) Inventors: Michael J. Moore, Omaha, NE (US); Anne Marie Giles, Omaha, NE (US); Denise Ann Mallory, LaVista, NE (US); Bruce Pollock, Omaha, NE (US); Erika Nelson Kessenger, Denver, CO (US); Claire Denise Matt, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 872 days.

(21) Appl. No.: 12/058,073

(22) Filed: Mar. 28, 2008

(51) Int. Cl.
*H04M 11/00* (2006.01)
*H04M 3/42* (2006.01)

(52) U.S. Cl.
CPC .............................. *H04M 3/42221* (2013.01)

(58) Field of Classification Search
CPC ....... H04M 3/5233; H04M 2203/2061; H04M 3/5232

USPC ....... 379/88.18, 88.09, 265.06, 67.1, 265.02; 705/4
See application file for complete search history.

(56) References Cited

U.S. PATENT DOCUMENTS

| | | | |
|---|---|---|---|
| 6,922,466 B1* | 7/2005 | Peterson et al. | 379/88.09 |
| 7,636,432 B2* | 12/2009 | Bushey | G06Q 20/10 340/506 |
| 9,167,095 B1* | 10/2015 | Selvin | H04M 3/5175 |
| 2002/0055862 A1* | 5/2002 | Jinks | 705/4 |
| 2005/0147228 A1* | 7/2005 | Perrella | H04M 7/003 379/265.06 |
| 2006/0256932 A1* | 11/2006 | Bushey et al. | 379/67.1 |
| 2009/0080640 A1* | 3/2009 | Waalkes | H04M 3/42221 379/265.06 |
| 2013/0244633 A1* | 9/2013 | Jacobs | H04W 68/00 455/415 |

* cited by examiner

*Primary Examiner* — Van D Huynh
(74) *Attorney, Agent, or Firm* — Raffi Gostanian

(57) ABSTRACT

A call center system is configured to record call data into call records. A transfer center within the call center transfers the call records to a database. A query engine, controlled from an interactive user interface, executes queries on the call data records in the database, allowing real-time analysis of the call data.

25 Claims, 3 Drawing Sheets

SYSTEM, METHOD AND COMPUTER READABLE MEDIUM FOR CALL CENTER MANAGEMENT

FIELD OF THE INVENTION

This disclosure relates to a system, method and computer readable medium for use in providing and managing data recorded in a call center environment.

BACKGROUND OF THE INVENTION

In today's environment, data is often logged in a variety of formats making access to the data for analysis difficult. The process to retrieve and analyze data is a lengthy and time consuming activity such that data can often be dated by the time the analysis is complete.

In a call center, data is collected automatically, such as by Interactive Voice Response systems or touch tone systems, as well as manually by call agents. Typically, the data must be collated some time later in a manual process that makes real-time analysis of call data difficult.

What is needed is a system, method and computer readable medium that facilitates processing of call data in real time.

SUMMARY OF THE INVENTION

In one embodiment of the disclosure, there is provided a call center system comprising at least one call center that records call data; a transfer center that transfers call data to at least one database; at least one query engine that executes at least one query on the call data in the at least one database; and an interface that displays a result of the at least one query to a user.

In one embodiment of the disclosure, there is provided call center system comprising at least one call center that records call data; and a transfer center that transfers call data to at least one database; wherein the transfer center transfers call data from the call center to the at least one database in real time.

In one embodiment of the disclosure, there is provided method for processing call data comprising creating a call record in response to initiation of a call; completing one or more fields of said call record; transferring said call record to a database in response to said call being concluded; and executing a query on said call record in said database.

In one embodiment of the disclosure, there is provided a method for analyzing call data comprising determining initiation of a call at a call center; recording call data at the call center; transferring the call data to a database in real time; and executing a query on the database.

In one embodiment of the disclosure, there is provided a computer readable medium comprising instructions for creating a call record; recording call data into one or more fields of said call record; and transferring said call data to a database.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
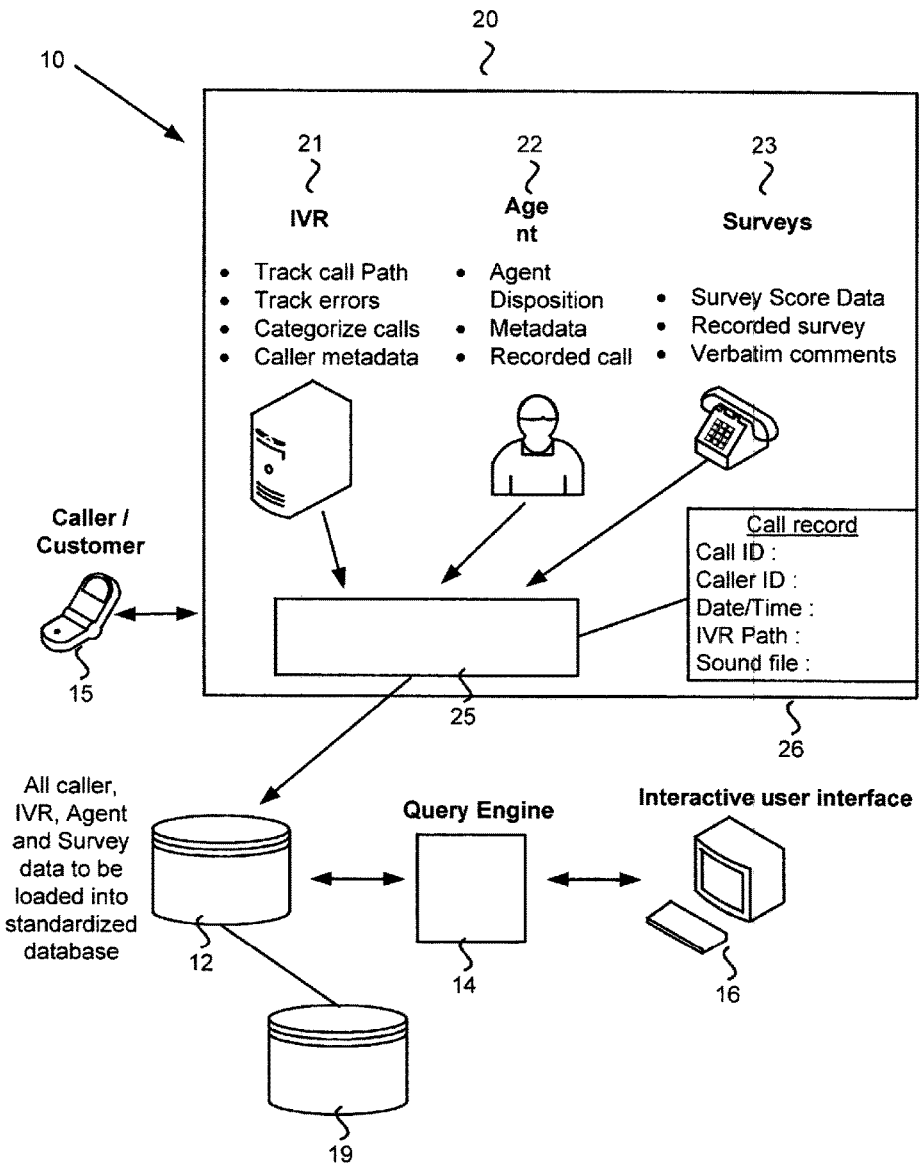
FIG. 1 schematically shows a call center system in accordance with an embodiment of the disclosure.

A system 10 in accordance with one embodiment of the disclosure is illustrated in FIG. 1. The system 10 includes a database 12, query engine 14 and an interactive user interface 16. A call center 20 receives and makes calls with a caller/customer 15. During a call, call data is recorded at the call center. The call data is uploaded to the database 12 in real time. The call center 20, database 12 and interface 16 may be provided within the same premises or may be distributed with suitable communications links between the separate components. In addition, the call center itself may be provided in a distributed manner, as is known for call centers.

The call center 20 may include components including an Interactive Voice Response (IVR) system 21, call center agents 22 as well as automated systems 23 for recording touch tone data, such as for survey responses. A transfer center controls the transfer of data from the call center to the database 12. A call may be initiated at the call center 20, either from within the call center 20, such as by a call center agent 22, or from outside of the call center by a caller 15. The term "caller" is used herein to denote persons outside of the call center regardless of whether that person placed or received the call.

Figure 2:
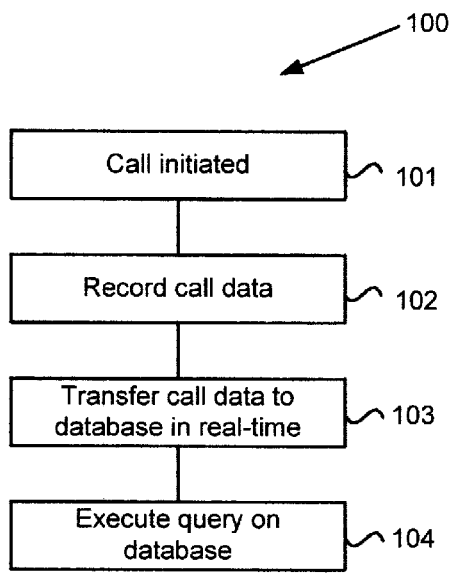
FIG. 2 shows a method for analyzing call data.

A method 100 for analyzing call data is illustrated in the FIG. 2. At step 101, a call is initiated allowing recording of call data to commence (step 102). The recorded call data is transferred to the database 12 in real time (step 103), thereby allowing queries to be executed (step 104) on the most up to date call data.

For each call initiated at the call center 20, a call record 26 is created. The call record 26 has a number of fields for recording call data. In one embodiment, the call record 26 may include fields for a call ID, caller ID, call device ID (e.g., mobile telephone identifier), time and date, call agent, and/or IVR identifier (e.g. if multiple IVR paths are provided by the call center) etc. Specific call fields may include call path exit points, survey data and fields for recording sound files or interactive touch tone data, such as for completing surveys and the like. Additional fields for recording useful call data will be apparent to a person skilled in the art.

The call record 26 has a data and addressing structure compatible with the database 12 that allows for easy transfer of the call record from the call center 20 to the database 12 by the transfer center 25. The call record 26 may be transferred completely or individual fields may be selected from the call record and transferred separately. The transfer center 25 may operate using any suitable transfer protocol, such as via an FTP link, TCP/IP transfer, direct file transfer, or similar. A call record will be initialized with empty fields which may be filled as data for those fields becomes available.

The fields of the call record 26 may be filled in a manner of ways. In one embodiment, a controller of the IVR system 21 enters data into the fields of the call record 26. In one embodiment, the call data may be entered by a call agent 22.

In one embodiment, the call record 26 is uploaded to the database 12 by the transfer center when the call record 26 is created. As the call progresses, call data may be periodically uploaded to the call record 26 in the database 12 by the transfer center 25. For example, data for the caller ID, call agent, and time and date fields may be uploaded as soon as the call is initiated. Other data, such as an IVR path field may be continually updated as a caller progresses through an IVR call path. Sound files and other inputs provided by the caller may also be recorded into the call record as they are provided by the caller and/or call agent. In one embodiment, a call data record may be generated and stored locally in the call center 20 during the call and uploaded to the database 12 once a call is completed. Using any of these methods ensures that call data is uploaded to the database 12 in real-time.

Once data is uploaded to the database 12, it becomes searchable by the query engine 14, thus providing real-time access to call data. Real-time access provides a high degree of functionality.

Figure 3:
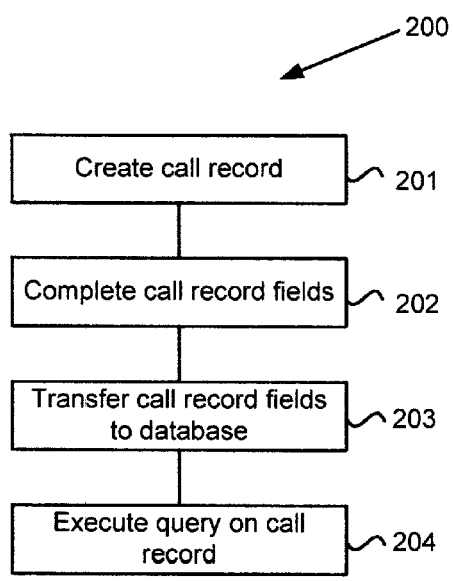
FIG. 3 shows a method for analyzing call records.

A method 200 for analyzing call records is illustrated in FIG. 3. A call record 26 is created at step 201. At step 202, data is entered into one or more fields of the call record 26 allowing the call record fields to be transferred to the database 12 (step 203). At step 204, queries are executed on the call records in the database 12.

In one embodiment, a query may identify frequent callers, for example where a caller ID or device ID is identified as making a number of calls above a threshold number in a time period shorter than a threshold time period. A high call frequency may be indicative of a troubled caller, a prank or fraudulent caller, or the like. A troubled caller, such as someone unfamiliar with an IVR system may further be identified as repeatedly exiting an IVR call path before reaching an end point of the call path. A query on the database 12 may identify that a caller, identified by their caller ID, has made multiple attempts at an IVR menu. Such callers may be flagged so that the next time that caller initiates a call, the caller may be transferred to a call agent who can handle the call directly. Thus, a troubled caller may be assisted by a call agent and prank callers may be dealt with appropriately, in particular, by having the call transferred to a higher level call agent, such as a supervisor or manager.

The real-time collection of call data allows easier analysis of call center statistics. Examples of queries that may be performed by the search and query engine 14 on the database 12 include:

ability to generate repeat caller statistics;
ability to perform real-time speech analytics queries as calls come in;
ability to generate top call paths;
average length of call;
authentication rate;
self service percent, i.e. the percentage of callers that are able to satisfactorily complete the call through an IVR menu without call agent assistance.

From the above examples, it will be apparent to a person skilled in the art that queries may be executed on a customer specific level or at any higher macro level that allows groupings of calls and/or callers to be made.

Statistical data generated by performing queries of the type described above allows call center designers to design more efficient and caller-friendly IVR systems, for example by locating problem points in an IVR path where callers terminate the call or seek call agent assistance. This can be vital in situations where a particular IVR application has a short lifespan requiring the need to process a high call rate.

Another application of the search and query engine is in processing survey responses in real-time. Survey responses may be recorded by call agents who enter caller responses directly into call records, by recording touch tone responses of callers, or by determining a path through an IVR menu as well as other methods. Survey data uploaded to the database 12 can be analyzed using database queries to collate statistics on survey answers.

The database 12 may be linked to one or more additional databases 19 for archiving call data. In one embodiment, the database 12 may store 1-2 months of data accessible by the query engine 14, while the archive database 19 stores older call data that may be searched by more specific queries from the query engine 14 to the archive database 19.

Queries may be generated by an operator through the interactive user interface 16. The interactive user interface 16 may be provided on a computer terminal with a suitable display screen. The interface 16 may connect with the query engine 14 via a suitable communications link, which in one embodiment may be an internet link. Queries may be generated using forms on the interface 16 or other standard templates. The interactive user interface 16 may also display query results in a variety of formats. In various embodiments, the interactive user interface allows:

ability to view a graphical image of a dominant IVR call path data at the macro level;
ability to view a graphical image of a customer cross-channel interaction—e.g. within the Web, IVR and Agent;
ability to graphically view exit point statistics, i.e. points at which customers exit the IVR—via hang-up, via agent transfer, etc;
ability to graphically view the success and error rates for all self-service functionality within the IVR;
ability to drill down from the macro level call path view to the customer level to obtain customer specific data;
ability to view customer transaction information for all calls into the IVR during a user-defined period;
ability to link from a customer-level call path view to related survey score information;
ability to link from a customer-level call path view to associated call recordings;
ability to link from a customer-level call path view to speech analytics results;
ability to view trending information on call paths, e.g. most frequently visited, etc.;
ability to graphically identify IVR call path points with high error rates, invalids and time outs;
ability to view summary level information on repeat caller statistics;
ability to drill down to detailed timing information for repeat caller statistics;
ability to trigger internal notifications for client services teams if pre-defined thresholds have been exceeded;
ability to trigger external notifications for external clients if pre-defined thresholds have been exceeded.

For ease of use, the interactive user interface may be configured with a set of standard queries that are selectable by menus or the like. The queries may be categorized with access to different categories being dependent on user permissions. In addition, access to certain call data may be limited based on a user profile and permissions.

Figure 4:
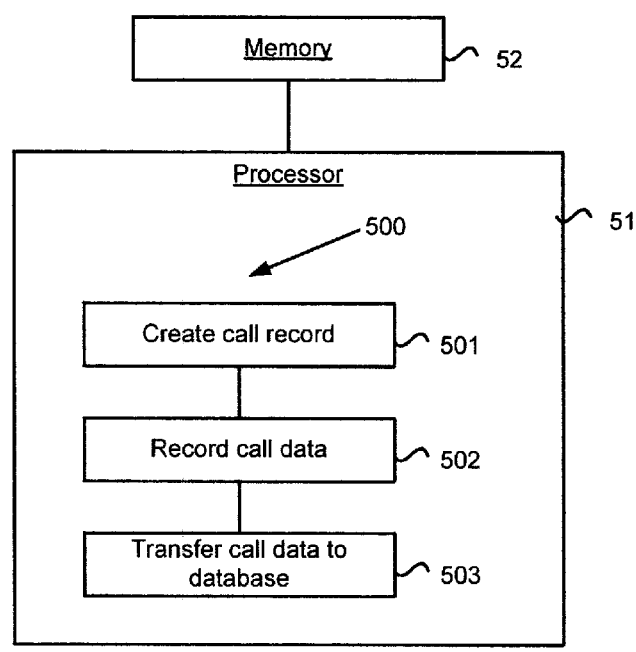
FIG. 4 shows a processor that may be used in a call center.

In one embodiment depicted in FIG. 4, the call center 20 includes at least one processor 51 operatively associated with at least one memory 52. The memory 52 stores an instruction set 500 executable on the processor 51. Executing the instructions causes the processor 51 to create a call record (step 501), record call data into one or more fields of the call record (step 502) and transfer the call data to the database (step 503).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A call center system comprising:
   at least one call center that records at least a call data;
   a transfer center that transfers at least the call data to at least one database;
   at least one query engine that executes at least one query on at least the call data in the at least one database;
   the at least one query identifies a frequent caller and transfers the frequent caller to a call agent;
   at least a call record is initialized with an empty field that is filled for recording call data when the call data becomes available; wherein the frequent caller is identified as making a number of calls above a threshold number in a time period shorter than a threshold time period and
   an interface that displays a result of the at least one query to the call agent.

2. The system according to claim 1 wherein said at least one call center comprises an interactive voice response system and wherein said call data comprises a caller path through said interactive voice response system.

3. The system according to claim 2 wherein said at least one query comprises an interactive voice response system path query.

4. The system according to claim 3 wherein said interactive voice response system path query determines an exit point of said caller path.

5. The system according to claim 1 wherein said call data comprises a caller ID wherein said at least one query determines a caller frequency using said caller ID.

6. The system according to claim 1 wherein said call data is uploaded from said call center to said at least one database in response to conclusion of a call.

7. The system according to claim 6 wherein said call center creates a call record in response to initiation of a call.

8. The system according to claim 1 wherein said call data is transferred from said call center to said at least one database in response to initiation of a call.

9. The system according to claim 1 wherein the call center records the call data in a call record and wherein the call record has a structure compatible with the database.

10. A call center system comprising:
    at least one call center that records at least a call data;
    a transfer center that transfers at least the call data to at least one database,
    wherein the transfer center transfers at least the call data from the call center to the at least one database in real time;
    at least one query engine that executes at least one query on at least the call data in the at least one database;
    at least a call record is initialized with an empty field that is filled for recording call data when the call data becomes available; wherein the frequent caller is identified as making a number of calls above a threshold number in a time period shorter than a threshold time period and
    the at least one query identifies a frequent caller and transfers the frequent caller to a call agent.

11. A call center system according to claim 10 wherein the call center records the call data during a call and wherein the transfer center transfers call data from the call center to the at least one database during the call.

12. A call center system according to claim 10 wherein the call center records the call data during a call and wherein the transfer center transfers call data from the call center to the at least one database in response to conclusion of the call.

13. A call center system according to claim 10 further comprising:
    at least one query engine that executes at least one query on the call data in the at least one database; and
    an interface that displays a result of the at least one query to a user.

14. A call center system according to claim 13 wherein said call data includes survey results and wherein said at least one query collates the survey results from a plurality of callers.

15. A method for processing call data comprising:
    creating a call record in response to initiation of a call;
    completing one or more fields of said call record;
    transferring said call record to a database in response to said call being concluded;
    executing a query on said call record in said database;
    at least a call record is initialized with an empty field that is filled for recording call data when the call data becomes available; wherein the frequent caller is identified as making a number of calls above a threshold number in a time period shorter than a threshold time period and
    identifying a frequent caller using the query and transfers the frequent caller to a call agent.

16. The method according to claim 15 further comprising recording a call path through an interactive voice response system in said call record.

17. The method according to claim 15 further comprising executing a query on said database.

18. A method for analyzing call data comprising:
    determining initiation of a call at a call center;
    recording call data at the call center;
    transferring the call data to a database in real time;
    executing a query on the database;
    initializing at least a call record with an empty field that is filled for recording call data when the call data becomes available; wherein the frequent caller is identified as making a number of calls above a threshold number in a time period shorter than a threshold time period and
    identifying a frequent caller using the query and transfers the frequent caller to a call agent.

19. The method according to claim 18 further comprising creating a call record in a database in response to initiation of said call.

20. The method according to claim 19 further comprising transferring data to one or more fields of said call record during said call.

21. The method according to claim 20 further comprising executing a query on said database during a call.

22. The method according to claim 21 further comprising determining an identity of a caller of said call, wherein executing a query comprises retrieving one or more call records associated with said identity.

23. A non-transitory computer readable storage medium comprising instructions that when executed by a processor, cause the processor to perform:
   creating a call record;
   recording call data into one or more fields of said call record;
   transferring said call data to a database; and
   executing at least one query on the call data in the at least one database;
   at least a call record is initialized with an empty field that is filled for recording call data when the call data becomes available; wherein the frequent caller is identified as making a number of calls above a threshold number in a time period shorter than a threshold time period and
   identifying a frequent caller using the at least one query and transfers the frequent caller to a call agent.

24. The non-transitory computer readable storage medium according to claim 23 further comprising instructions for determining conclusion of a call and transferring the call record to the database.

25. The non-transitory computer readable storage medium according to claim 23 wherein said call data is transferred to said database in real time.

* * * * *